(12) United States Patent
Kiyosawa

(10) Patent No.: US 6,732,435 B2
(45) Date of Patent: May 11, 2004

(54) METHOD OF MANUFACTURING A LIGHTWEIGHT BEARING

(75) Inventor: Yoshihide Kiyosawa, Nagano-ken (JP)

(73) Assignee: Harmonic Drive Systems Inc., Tokyo (JP)

(*) Notice: Subject to any disclaimer, the term of this patent is extended or adjusted under 35 U.S.C. 154(b) by 137 days.

(21) Appl. No.: 10/150,965

(22) Filed: May 21, 2002

(65) Prior Publication Data

US 2002/0174545 A1 Nov. 28, 2002

(30) Foreign Application Priority Data

May 22, 2001 (JP) ........................................ 2001-151832

(51) Int. Cl.$^7$ ................................................ B21K 1/04
(52) U.S. Cl. ............................... 29/898.066; 29/898.13; 29/898.063; 228/193; 384/569; 384/615
(58) Field of Search .................... 29/898.063, 898.066, 29/898.13, 898.14, 898.047; 384/492, 499, 513, 569, 615; 228/193

(56) References Cited

U.S. PATENT DOCUMENTS

| | | | | |
|---|---|---|---|---|
| 2,724,624 A | * | 11/1955 | Barr | 384/492 |
| 3,099,073 A | * | 7/1963 | Olson | 29/898.066 |
| 3,211,502 A | * | 10/1965 | Lamson et al. | 384/280 |
| 3,345,895 A | * | 10/1967 | Morrison | 83/105 |
| 3,452,415 A | * | 7/1969 | Beazley et al. | 29/898.047 |
| 3,501,208 A | * | 3/1970 | Kessler | 384/547 |
| 3,683,474 A | * | 8/1972 | Young, Jr. | 29/898.043 |
| 3,748,722 A | * | 7/1973 | Moore | 228/193 |
| 6,655,845 B1 | * | 12/2003 | Pope et al. | 384/492 |

FOREIGN PATENT DOCUMENTS

| | | | |
|---|---|---|---|
| JP | 02-075479 | * | 3/1990 |
| JP | 10-195631 | * | 7/1998 |
| JP | 2000-186718 | * | 7/2000 |

* cited by examiner

Primary Examiner—David P. Bryant
Assistant Examiner—Eric Compton
(74) Attorney, Agent, or Firm—Darby & Darby

(57) ABSTRACT

A method of manufacturing a lightweight bearing in which raceway surface parts are formed of iron-based material and body members are formed of a lightweight material that is lighter than the iron-based material. Bearing rings are manufactured by producing first and second split body members whose shapes are identical to those obtained by dividing the body members transversely along a plane perpendicular to the center axis, producing split raceway surface members whose shapes are identical to those obtained by similarly dividing the raceway surface formation members, and bonding together split raceway surface members and split body members.

4 Claims, 3 Drawing Sheets

(a)

(b)

(c)

METHOD OF MANUFACTURING A LIGHTWEIGHT BEARING

This application claims priority under 35 U.S.C. §§119 and/or 365 to JP 2001-151832 filed in Japan on May 22, 2001; the entire content of which is hereby incorporated by reference.

BACKGROUND OF THE INVENTION

1. Field of the Invention

The present invention relates to a method of manufacturing a lightweight bearing in which raceway portions of bearing rings are formed of an iron-based material and other parts are formed of a lightweight material such as aluminum alloy.

2. Description of the Prior Art

In JP-A 2000-186718, this applicant proposed a lightweight cross-roller bearing having composite bearing rings in which bearing ring body members were formed of a light metal alloy and raceway formation members were formed of iron-based material.

A main object of the present invention is to provide a method of manufacturing a lightweight bearing that includes composite bearing rings that makes it possible to readily manufacture the composite bearing rings.

SUMMARY OF THE INVENTION

To attain the above and other objects, the present invention proposes a method of manufacturing a lightweight bearing in which an outer ring comprises an outer-ring body member and an outer-ring raceway surface formation member that is fixed to an inner peripheral surface of the outer-ring body member and forms a raceway surface on its inner peripheral surface, an inner ring comprises an inner-ring body member and an inner-ring raceway surface formation member that is fixed to an outer peripheral surface of the inner-ring body member and forms a raceway surface on its outer peripheral surface, the outer-ring raceway surface formation member and inner-ring raceway surface formation member are formed of iron-based material and the outer-ring body member and inner-ring body member are formed of a lightweight material that is lighter than the iron-based material, said method comprising manufacturing the outer ring by the following steps: manufacturing first and second outer-ring split body members so that shapes thereof are identical to those obtained by dividing the outer-ring body member transversely along a plane perpendicular to a center axis of the body member, manufacturing first and second outer-ring split raceway surface members so that shapes thereof are identical to those obtained by dividing the outer-ring raceway surface formation member transversely along a plane perpendicular to a center axis of the raceway surface formation member, manufacturing a first outer-ring split member by diffusion-bonding the first outer-ring split raceway surface member to the first outer-ring split body member, manufacturing a second outer-ring split member by diffusion-bonding the second outer-ring split raceway surface member to the second outer-ring split body member, and diffusion-bonding the first and second outer-ring split members.

The above and other objects can also be attained by a method of manufacturing a lightweight bearing in which an outer ring comprises an outer-ring body member and an outer-ring raceway surface formation member that is fixed to an inner peripheral surface of the outer-ring body member and forms a raceway surface on its inner peripheral surface, an inner ring comprises an inner-ring body member and an inner-ring raceway surface formation member that is fixed to an outer peripheral surface of the inner-ring body member and forms a raceway surface on its outer peripheral surface, the outer-ring raceway surface formation member and inner-ring raceway surface formation member are formed of iron-based material and the outer-ring body member and inner-ring body member are formed of a lightweight material that is lighter than the iron-based material, said method comprising manufacturing the inner ring by the following steps: manufacturing first and second inner-ring split body members so that shapes thereof are identical to those obtained by dividing the inner-ring body member transversely along a plane perpendicular to a center axis of the body member, manufacturing first and second inner-ring split raceway surface members so that shapes thereof are identical to those obtained by dividing the inner-ring raceway surface formation member transversely along a plane perpendicular to a center axis of the raceway surface formation member, manufacturing a first inner-ring split member by diffusion-bonding the first inner-ring split raceway surface member to the first inner-ring split body member, manufacturing a second inner-ring split member by diffusion-bonding the second inner-ring split raceway surface member to the second inner-ring split body member, and diffusion-bonding the first and second inner-ring split members.

The lightweight material can be an alloy of a light metal such as aluminum alloy or titanium alloy, or can be plastic, or ceramics.

Further features of the invention, its nature and various advantages will be more apparent from the accompanying drawings and following detailed description of the invention.

DESCRIPTION OF THE PREFERRED EMBODIMENT

Figure 1:
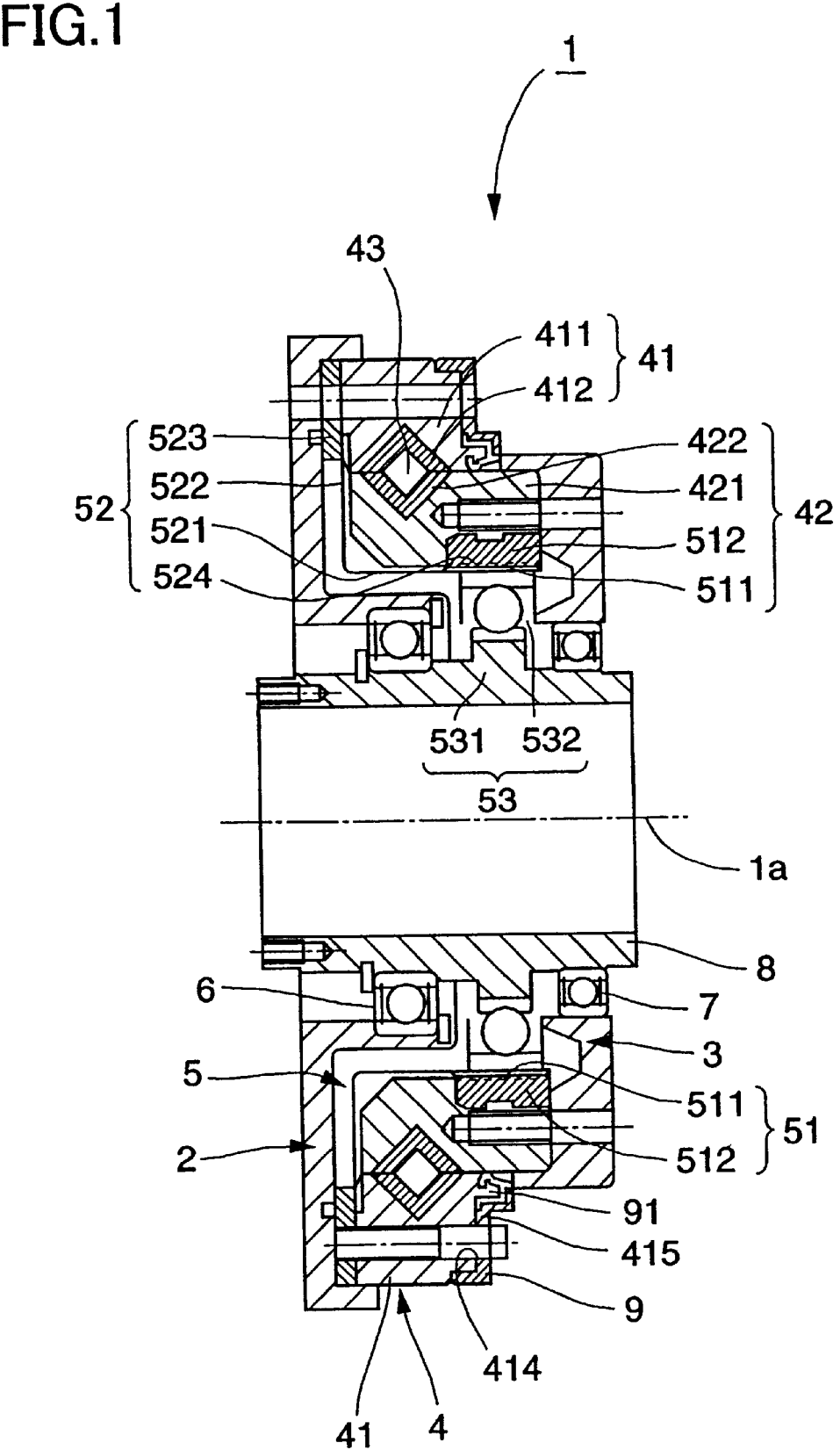
FIG. 1 is a cross-sectional view of a top-hat-shaped wave gear drive unit in which the present invention is applied.
Figure 2:
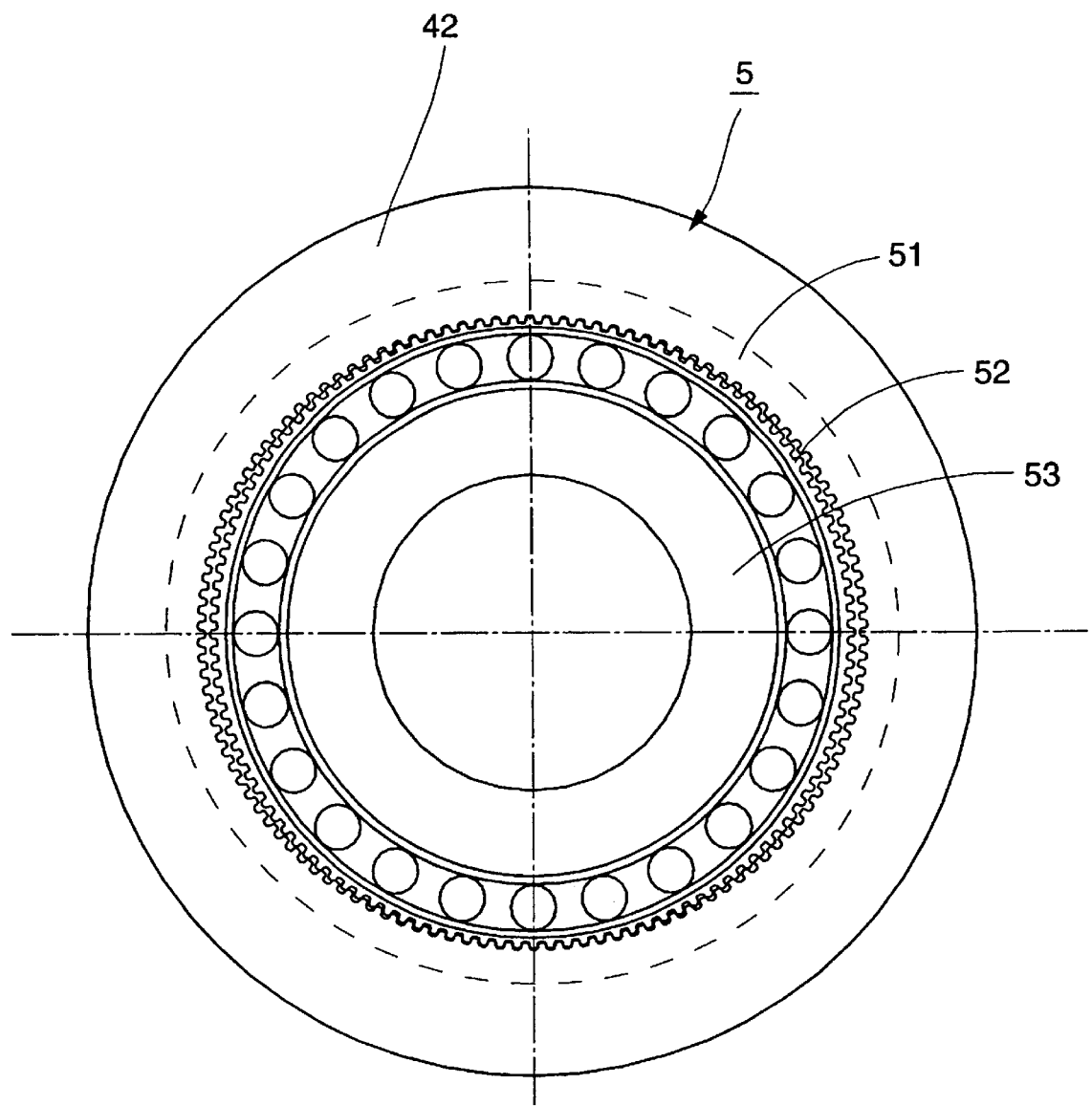
FIG. 2 is an explanatory view showing the configuration of the wave gear drive shown in FIG. 1.

A wave gear drive unit in which the present invention is applied will now be described with reference to the drawings. FIG. 1 is a cross-sectional view of a top-hat-shaped wave gear drive that incorporates a cross-roller bearing manufactured by the method of the present invention, and FIG. 2 illustrates the configuration of the wave gear drive.

The wave gear drive unit 1 of this example has a first endplate 2 and second end-plate 3 disposed at a set spacing along a unit axis 1*a*, and a cross-roller bearing 4 located between the first and second end-plates 2 and 3. The first and second end-plates 2 and 3 and the cross-roller bearing 4 form a unit housing in which there is a top-hat-shaped wave gear drive 5. The first and second end-plates 2 and 3 have a hole through their center for a hollow input shaft 8 that is rotatably supported by ball bearings 6 and 7.

The cross-roller bearing 4 includes an outer ring 41 and an inner ring 42, and a plurality of rollers 43 inserted in a circular raceway formed between the inner and outer rings.

The outer ring 41 is a composite part that includes outer-ring body member 411, and an outer-ring raceway formation member 412 that is fixed to an inner peripheral surface of the outer-ring body member and is formed on its inner peripheral surface with a raceway surface.

The inner ring 42 is a composite part that includes an inner-ring body member 421, and a circular inner-ring raceway formation member 422 that is integrally joined to a part of the outer peripheral surface at one end of the inner-ring body member 421 and is formed on its outer peripheral surface with a raceway surface. The inner ring 42 includes a circular teeth formation member 512 that is integrally joined to a part of the outer peripheral surface at the other end of the inner-ring body member 421 and has internal teeth 511 formed on its inner peripheral surface. That is, the inner ring 42 is also a part of the rigid internal gear of the wave gear drive 5, as described below. The inner-ring body member 421 is affixed to the second end-plate 3 by bolts (not shown).

The wave gear drive 5 includes a circular rigid internal gear 51, a top-hat-shaped flexible external gear 52, and an elliptical wave generator 53 disposed inside the flexible external gear 52. The rigid internal gear 51 is formed as an integral part of the inner ring 42 of the cross-roller bearing 4. Only the teeth formation member 512 is formed as a separate member, with the internal teeth 511 formed on the inner peripheral surface as an integral part on the inner peripheral surface of the inner ring 42 that is also used as the internal gear.

The flexible external gear 52 includes a cylindrical body 521, a circular diaphragm 522 formed continuously with one end of the cylindrical body 521 to extend radially outward, a thick, annular boss 523 formed integrally with the outer peripheral surface of the diaphragm 522, and external teeth 524 formed at the outer peripheral surface of the other end of the cylindrical body 521, forming the top-hat shape. The boss 523 is disposed between the annular end surface of the outer ring 41 of the cross-roller bearing 4 and the first end-plate 2; bolts (not shown) are used to attach these parts. Thus, by means of the cross-roller bearing 4, the flexible external gear 52 and rigid internal gear 51 are supported in a way that allows relative rotation of the gears.

The wave generator 53 includes a rigid, elliptical cam plate 531 formed on the outer peripheral surface of the input shaft 8 and a ball bearing 532. The ball bearing 532 is disposed between the outer peripheral surface of the rigid cam plate 531 and inner peripheral surface of the flexible external gear 52 where the external teeth 524 are formed.

A circular plate 9 is provided on a circular end face 415 of the outer-ring body member 411 in which bolt holes 414 are formed, to form a seating for the bolts. The plate 9 is also secured to the outer-ring body member 411 by the bolts. The inside edge of the plate 9 has an oil-seal ring 91, which provides an oil-tight seal between the outer ring 41 and the inner ring 42.

The part of the input shaft 8 projecting from the second end-plate 3 is connected to the shaft of a motor or other such source of rotation. The first end-plate 2 or second end-plate 3 is fixed on the load side. When the elliptical wave generator 43 is rotated by the rotation of the shaft 8, it flexes the external gear into an elliptical shape, pushing the external teeth 524 at the two ends of the ellipse into meshed engagement with the opposing internal teeth 511, and moving the mesh points around the circumference, generating a relative rotation between the gears 51 and 52 arising from the difference in the number of gear teeth. There is a difference in the number of internal and external teeth, which generates a relative rotation between the internal and external gears 51 and 52. The input rotational speed is thus greatly reduced. The first end-plate 2 or second end-plate 3 is connected to the load, and the other end-plate is fixed so that it does not rotate, so the reduced rotation output is transmitted to the load side.

As described above, the outer ring 41 is a composite part constituted by the outer-ring body member 411 and the outer-ring raceway formation member 412. Similarly, the inner ring 42 is a composite part constituted by the inner-ring body member 421, the inner-ring raceway formation member 422, and the teeth formation member 512 that has internal teeth 511 formed on the inner peripheral surface thereof. The outer-ring body member 411 and the inner-ring body member 421 are formed of a lightweight material that is lighter than iron-based material, such as an alloy of a light metal such as aluminum alloy or titanium alloy, or plastic, or ceramics. In contrast, the outer-ring raceway formation member 412 and the inner-ring raceway formation member 422, which have raceway surfaces, and the teeth formation member 512 on which the internal teeth 511 are provided, are all formed of an ordinary iron-based material. In this example, the input shaft 8 and the rigid cam plate 531 which is formed on the outer peripheral surface of the input shaft 8 are also formed of a lightweight material such as an alloy of a light metal such as aluminum alloy or titanium alloy, or of plastic or ceramics.

Figure 3:
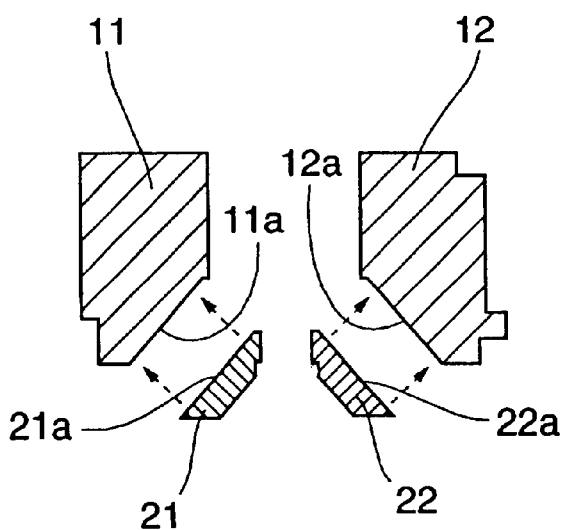
FIGS. 3(*a*), 3(*b*), and 3(*c*) illustrate the method of manufacturing the outer and inner rings in the wave gear drive of FIG. 1.
Figure 3:
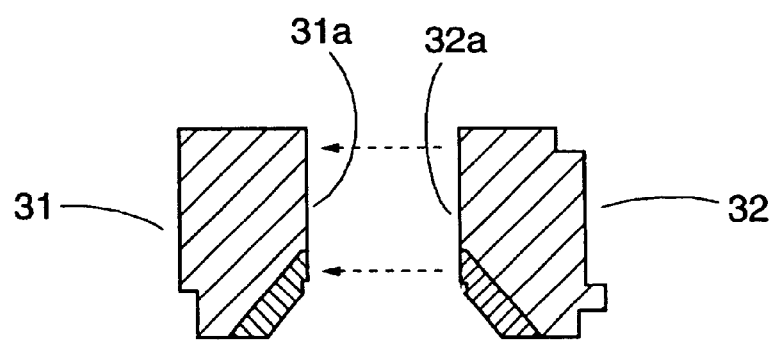
Figure 3:
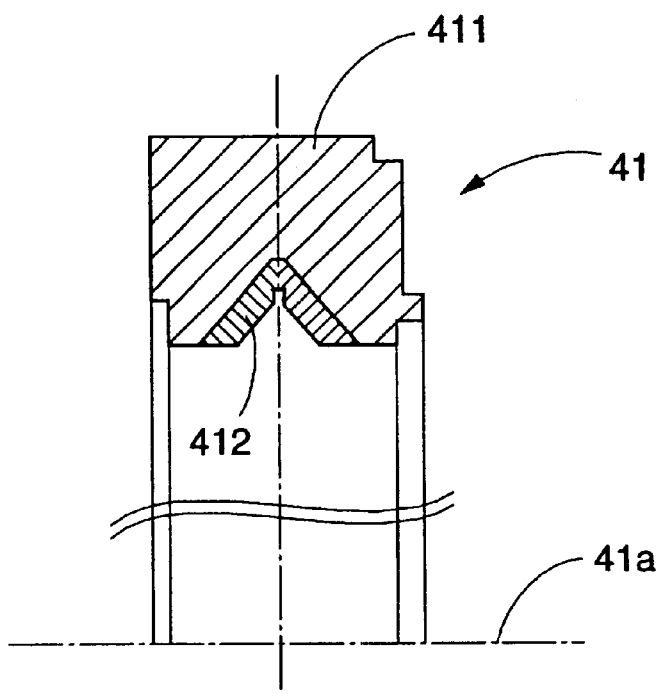

The method of manufacturing the composite inner and outer rings 42 and 41 will now be described. First, the method of manufacturing the outer ring 41 will be described, with reference to FIG. 3.

As shown in FIG. 3(a), first and second outer-ring split body members 11 and 12 are manufactured, the shapes of which are identical to those obtained, by dividing the resultant outer-ring body member 411 transversely along a plane 41b perpendicular to the center axis 41a (FIG. 3(c)). The inner peripheral surface of each of the outer-ring split body members 11 and 12 has a diffusion-bonding surface 11a and 12a formed at an angle of 45 degrees. Also, first and second outer-ring split raceway surface formation members 21 and 22 are manufactured so that the shapes of these members are identical to those obtained by dividing the resultant outer-ring raceway surface formation member 412 transversely along the plane 41b perpendicular to the center axis 41a. The outer peripheral surface of each of the members 21 and 22 has a diffusion-bonding surface 21a and 22a formed at an angle of 45 degrees relative to the center axis.

Next, as shown in FIG. 3(b), the diffusion-bonding surface 21a of the member 21 is placed on the diffusion-bonding surface 11a of the member 11 and the members are bonded together. The bonding is effected by applying a prescribed pressure to the diffusion-bonding surfaces in a vacuum at a prescribed high temperature. This produces an annular first outer-ring split member 31. In the same way, the diffusion-bonding surface 22a of the member 22 is placed on the diffusion-bonding surface 12a of the member 12 and the members are bonded together to produce an annular second outer-ring split member 32.

As shown by FIGS. 3(b) and 3(c), the circular side-faces 31a and 32a of the first and second outer-ring split members 31 and 32 are then joined by diffusion-bonding, thereby producing the outer ring 41. The same procedure is used to manufacture the inner ring 42. In the case of the inner ring 42, diffusion-bonding is also used to bond the teeth formation member 512 to the inner ring 42.

While the above embodiment has been described with reference to the present invention applied to a cross-roller bearing, it is to be understood that the invention can be similarly applied to other types of bearing such as ball bearings.

As described in the foregoing, in the lightweight bearing according to the present invention, the outer-ring and inner-ring body members are formed of lightweight materials, and just the outer-ring and inner-ring raceway formation members, which need to have high strength, are formed of iron-based material, and these members are bonded together. Thus, in accordance with the present invention, it is possible to realize a very light bearing. The lightweight body members and raceway members formed of iron-based material are diffusion-bonded together to form the composite bearing rings, making it possible to readily consolidate the bearing rings.

What is claimed is:

1. A method of manufacturing a lightweight bearing in which an outer ring comprises an outer-ring body member and an outer-ring raceway surface formation member that is fixed to an inner peripheral surface of the outer-ring body member and forms a raceway surface on its inner peripheral surface, an inner ring comprises an inner-ring body member and an inner-ring raceway surface formation member that is fixed to an outer peripheral surface of the inner-ring body member and forms a raceway surface on its outer peripheral surface, the outer-ring raceway surface formation member and inner-ring raceway surface formation member are formed of iron-based material and the outer-ring body member and inner-ring body member are formed of a lightweight material that is lighter than the iron-based material;

said method comprising manufacturing the outer ring by the following steps:

manufacturing first and second outer-ring split body members so that shapes thereof are identical to those obtained by dividing the outer-ring body member transversely along a plane perpendicular to a center axis of the body member;

manufacturing first and second outer-ring split raceway surface members so that shapes thereof are identical to those obtained by dividing the outer-ring raceway surface formation member transversely along a plane perpendicular to a center axis of the raceway surface formation member;

manufacturing a first outer-ring split member by diffusion-bonding the first outer-ring split raceway surface member to the first outer-ring split body member;

manufacturing a second outer-ring split member by diffusion-bonding the second outer-ring split raceway surface member to the second outer-ring split body member; and diffusion-bonding the first and second outer-ring split members.

2. A method of manufacturing a lightweight bearing in which an outer ring comprises an outer-ring body member and an outer-ring raceway surface formation member that is fixed to an inner peripheral surface of the outer-ring body member and forms a raceway surface on its inner peripheral surface, an inner ring comprises an inner-ring body member and an inner-ring raceway surface formation member that is fixed to an outer peripheral surface of the inner-ring body member and forms a raceway surface on its outer peripheral surface, the outer-ring raceway surface formation member and inner-ring raceway surface formation member are formed of iron-based material and the outer-ring body member and inner-ring body member are formed of a lightweight material that is lighter than the iron-based material;

said method comprising manufacturing the inner ring by the following steps:

manufacturing first and second inner-ring split body members so that shapes thereof are identical to those obtained by dividing the inner-ring body member transversely along a plane perpendicular to a center axis of the body member;

manufacturing first and second inner-ring split raceway surface members so that shapes thereof are identical to those obtained by dividing the inner-ring raceway surface formation member transversely along a plane perpendicular to a center axis of the raceway surface formation member;

manufacturing a first inner-ring split member by diffusion-bonding the first inner-ring split raceway surface member to the first inner-ring split body member;

manufacturing a second inner-ring split member by diffusion-bonding the second inner-ring split raceway surface member to the second inner-ring split body member; and diffusion-bonding the first and second inner-ring split members.

3. The method according to claim 1, wherein the lightweight material is an alloy of a light metal such as aluminum alloy or titanium alloy, or plastic, or ceramics.

4. The method according to claim 2, wherein the lightweight material is an alloy of a light metal such as aluminum alloy or titanium alloy, or plastic, or ceramics.

* * * * *